A. L. DEANE.
COLTER ATTACHMENT FOR PLOWS.
APPLICATION FILED FEB. 21, 1908.

907,013.

Patented Dec. 15, 1908.

WITNESSES
Chas. K. Davies
Myron F. Cleary

INVENTOR
A. L. Deane
By P. L. Parker
Attorney

UNITED STATES PATENT OFFICE.

ARTEMAS L. DEANE, OF FULLERTON, NORTH DAKOTA.

COLTER ATTACHMENT FOR PLOWS.

No. 907,013.      Specification of Letters Patent.      Patented Dec. 15, 1908.

Application filed February 21, 1908. Serial No. 417,014.

*To all whom it may concern:*

Be it known that I, ARTEMAS L. DEANE, a citizen of the United States, residing at Fullerton, in the county of Dickey and State of North Dakota, have invented certain new and useful Improvements in Colter Attachments for Plows, of which the following is a specification.

My invention relates to colter attachments for plows and particularly contemplates the provision of a movable plow having its colter attached thereto, in such manner that when said colter strikes an obstruction, said plow will be raised to escape the same.

My invention resides particularly in the provision of pivoted plow shanks, and pivoted colter shanks, suitably connected in such manner that when said colter is rocked upon its pivot by striking an obstruction, it will, by means of its connection with the plow shank, rock said plow shank to lift the plow point so that the same will miss the said obstruction.

Figure 1:
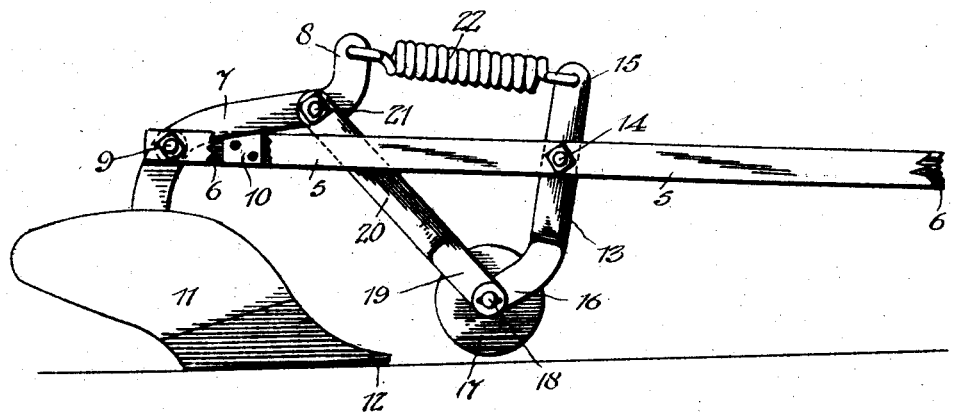
Figure 2:
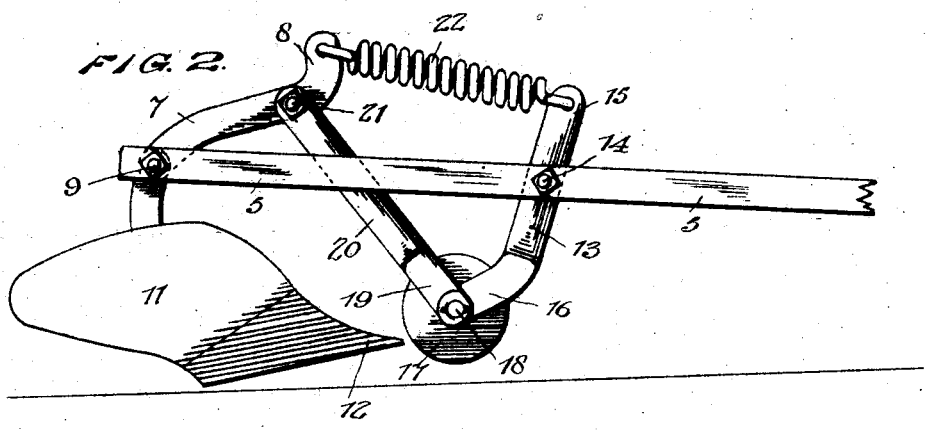

My invention further resides in the following features of construction, arrangement, and operation, to be hereinafter described with reference to the accompanying drawings forming a part of this specification, in which like numerals are used to designate like parts throughout the figures, and in which, Figure 1 is a side elevation of a plow constructed in accordance with my invention, and in its normal position, and Fig. 2 is a similar view, illustrating the parts actuated as they will be, upon striking an obstacle.

In the practical embodiment of my invention, in which like numerals are used to desspaced parallel members 5 and 6 between which and at their rear end is pivoted a curved plow shank 7, having an angular upward extension 8 upon its upper end. Adjacent the pivot point 9 of the plow shank 7, the members 5 and 6 comprising the plow beam, are rigidly connected by a spacing block 10, upon which said plow shank 7 rests when its plow 11, of the usual construction, and provided with a point 12, is in engagement with the wheel to be worked. Forwardly of the plow shank 7, and the spacing block 10, a colter shank 13 is pivoted between the members 5 and 6 of the plow beam at 14, with its upper end 15, extending above said plow beam, and having its lower end 16 extending therebelow, bifurcated for the reception of a revoluble roller 17, normally operating as the ordinary rolling colter. The roller 17 is provided with operating trunnions 18 about the outer ends of which are mounted the ends of the lower bifurcated portion 19 of a connecting member 20, extending upwardly, between the members 5 and 6 of the plow beam and pivotally secured at 21 to the plow shank 7, adjacent the base of its upper angular extension 8.

By comparison between the Figs. 1 and 2 of the drawing, the operation of the device as just described, will be readily apparent, the actuation of the colter shank 13 and the plow shank 7, being similar and simultaneous, inasmuch as the connecting member 20 extends therebetween on a direct line from the force encountered by roller 17. A coil spring 22 is arranged between and connected to the upper ends 8 and 15 of the plow shank 7 and colter shank 13 respectively, and serves to return the elements to their normal position as shown in Fig. 1 from their actuated position as shown in Fig. 2, the spacing block 10 serving to limit the return movement.

Having fully described my invention, I claim:

1. In a device of the character described, the combination of a plow beam, a plow movably secured thereto, a colter movably secured to said beam forwardly of said plow, connections between said colter and said plow for moving the latter upon the actuation of the former by an obstacle in its path, and other connections between said colter and said plow for returning the same to their normal position after such actuation, substantially as described.

2. In a device of the character described, the combination of a plow beam, a plow movably secured thereto, a colter movably secured to said beam forwardly of said plow, connections between said colter and said plow for moving the latter upon the actuation of the former by an obstacle in its path, and a spring interposed between said colter and said plow for tensioning such movement, and for returning the same to their normal position after actuation, substantially as described.

3. In a device of the character described, the combination of a plow beam, a plow shank pivotally mounted intermediate its ends upon said plow beam and carrying a plow upon its lower end therebelow, a colter shank pivotally mounted intermediate its ends upon said plow beam, and provided with a colter upon its lower end operating forwardly of said plow, connections between said colter and the upper end of said plow shank for swinging the same upon its pivot to raise the plow point when the said colter is swung upon its pivot upon engagement with an obstacle in its path, and a retractile spring actuating the upper end of said plow and colter shanks to return the same to their normal position, after actuation, substantially as described.

4. In a device of the character described, the combination of a plow beam, a plow shank pivotally mounted intermediate its ends upon said plow beam and carrying a plow upon its lower end therebelow, a colter shank pivotally mounted intermediate its ends upon said plow beam, and provided with a colter upon its lower end operating forwardly of said plow, connections between said colter and the upper end of said plow shank for swinging the same upon its pivot to raise the plow point when the said colter is swung upon its pivot upon engagement with an obstacle in its path, a retractile spring actuating the upper end of said plow and colter shanks to return the same to their normal position after actuation, and means to limit the return movement of the several elements, substantially as described.

In testimony whereof I affix my signature in presence of two witnesses.

ARTEMAS L. DEANE.

Witnesses:
ANNA R. DEAN,
ROBT. DEANE.